United States Patent
Monberg et al.

(12) 
(10) Patent No.: US 6,523,021 B1
(45) Date of Patent: Feb. 18, 2003

(54) BUSINESS DIRECTORY SEARCH ENGINE

(75) Inventors: James C. Monberg, Seattle, WA (US); Rico Mariani, Kirkland, WA (US); Sanford A. Staab, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 09/629,275

(22) Filed: Jul. 31, 2000

(51) Int. Cl.[7] .............................................. G06F 17/30
(52) U.S. Cl. ........................... 707/2; 707/10; 707/104.1
(58) Field of Search .............................. 707/104.1, 1–5, 707/10

(56) References Cited

U.S. PATENT DOCUMENTS

| | | | | |
|---|---|---|---|---|
| 4,945,475 A | * | 7/1990 | Bruffey et al. ................. | 707/1 |
| 5,944,769 A | * | 8/1999 | Musk et al. ................. | 701/201 |
| 5,987,446 A | * | 11/1999 | Corey et al. .................... | 707/5 |
| 6,148,289 A | * | 11/2000 | Virdy ............................. | 705/1 |

OTHER PUBLICATIONS

Recovery of Data Pages After Partial Page Writes, Aug. 1991, IBM Technical Disclosure Bulletin, vol. 34, No. 3 pp. 69–83.*

* cited by examiner

*Primary Examiner*—Jack Choules
(74) *Attorney, Agent, or Firm*—Woodcock Washburn LLP

(57) ABSTRACT

A system and method for efficiently searching directory listing information to obtain more relevant results is provided. In a computer system running a computing application, it is advantageous to provide search capabilities, in the form of a search engine, to operators to assist them in their effort of retrieving desired data. The search engine may cooperate with a data store having directory listing information to provide listings data to an operator. In an illustrative implementation, this search engine may be deployed on an Internet Web site that offers business listing information. The search system may comprise a user interface to enter search query information, a data store that houses a variety of directory listing information according to a predefined data taxonomy, and a means for displaying the search results. In operation, the search engine offers a variety of search options, such as, search by business name, by business categories levels, by geographic position of the user or the business, or a combination thereof. Depending on the search query entered, the search engine will perform either a bounded search (i.e. a search bounded to a specific geographic area), a proximity search (i.e. a search proximate to a computed centroid), or a combination of the two to find the most relevant directory listings. Using the inputted search qualifiers, the search engine polls the data store according to a predefined set of rules and instructions for the relevant directory listing information. These rules are directly related to the taxonomy of the data store.

20 Claims, 15 Drawing Sheets

BUSINESS DIRECTORY SEARCH ENGINE

BACKGROUND OF THE INVENTION

1. Field of the Invention

The present invention relates to the field of searchable directories. Particularly to searchable online directories, and more particularly, to adaptable and dynamic search engines for use with online business directories.

2. Brief Description of Prior Developments

Today, the Internet has proven itself to be an extremely effective communication medium. Given this reality, it is not surprising that there is a sharp increase in the number of content providers that employ the Internet, making the Internet space very competitive. Generally, content providers have varied offerings that include a wide range of products and services. Novelty, quality, and reliability tend to be distinguishing characteristics that separate competing content providers. Accordingly, Internet content and service providers are constantly trying to develop enhancements, improve their reliability, and improve their quality of content to better their position in the market space.

In the Internet services market space, a key service offers users access to searchable databases that maintain a variety of data and information. For example, databases containing indexed and categorized business listings, such as, a business directory. In the physical realm, this business directory is generally referred to as the "Yellow Pages". Typically, Internet based "Yellow Pages" take the form of a computing application providing, among a variety of other functions, the ability to search vast amounts of business demographic information. The search component of this application allows users to pair down their search by a number of search qualifiers, such as, business name, business type, and geographic location (of either the business or of the user).

Internet based business directories generally rely on third party business information vendors for content. The third party information, however, is grouped according to general category schemes that provide little insight, if any, to the specific demographic information of the businesses listed in these categories. Business directory search engines that use such content perform de minimus operations often regurgitating the business listings according to the general category scheme. For example, a search for "pizza" in this type of business directory may result in a list of all of the business listings having the word "pizza". As such these business directories often leave a user to navigate through volumes of unhelpful business results, rendering their initial search almost futile. In addition, current business directory search engines have complicated and cumbersome user interfaces that require the user to input a significant amount of preference information before performing the search.

From the foregoing it can be appreciated that a need exists for directory-type search engines that are capable of efficiently providing more relevant and useful content to users. By tailoring a search engine to provide more relevant data that in a more efficient manner, users are required to expend fewer resources to obtain desired directory listings.

SUMMARY OF THE INVENTION

The present invention provides a system and methods that allow the searching, maintenance, and display of directory listings. In an illustrative implementation, the system and methods contemplated may be realized in the form of an enhanced business directory search engine. The business directory search engine may support a user interface capable of accepting user search preference information. The business directory search engine may employ user preference information to provide relevant and helpful search results when processing search queries. The search preference information allows the user to search for information about businesses in a variety of manners including by business location, the location of the user, or by general business categories.

In operation, the business directory search engine may perform searches, including bounded and proximity searches, on business listing information using inputted data indicative of various location information, such as city name, state name, zip code, address, or a combination thereof. A bounded search may employ location information indicative of city name and state name, whereas a proximity search may utilize the zip code or address location information. The proximity search may perform the steps of creating a central geographic point (centroid) and then searching for businesses that satisfy the user's search query within a specific distance from the established centroid (i.e. in a pre-define distance range).

Further, the invention provides that the business information, used by the search engine, may reside in a data store. This business information may be grouped, referenced, and categorized according to a pre-defined taxonomy. In addition, the information may be stored in an efficient data structure that may be passed between the database and the search engine application. In operation, the search engine may rely on the taxonomy in conjunction with the user preference information to find, gather, and display to the user the most relevant information to the user's search query.

DETAILED DESCRIPTION OF THE DRAWINGS

The system to provide an efficient search engine that provides relevant business directory listing information is further described with reference to the accompanying drawings in which:

FIG. 3B is a screen show of an exemplary display pane showing illustrative search results in accordance with the present invention;

DETAILED DESCRIPTION OF ILLUSTRATIVE EMBODIMENTS

Overview

Figure 1:
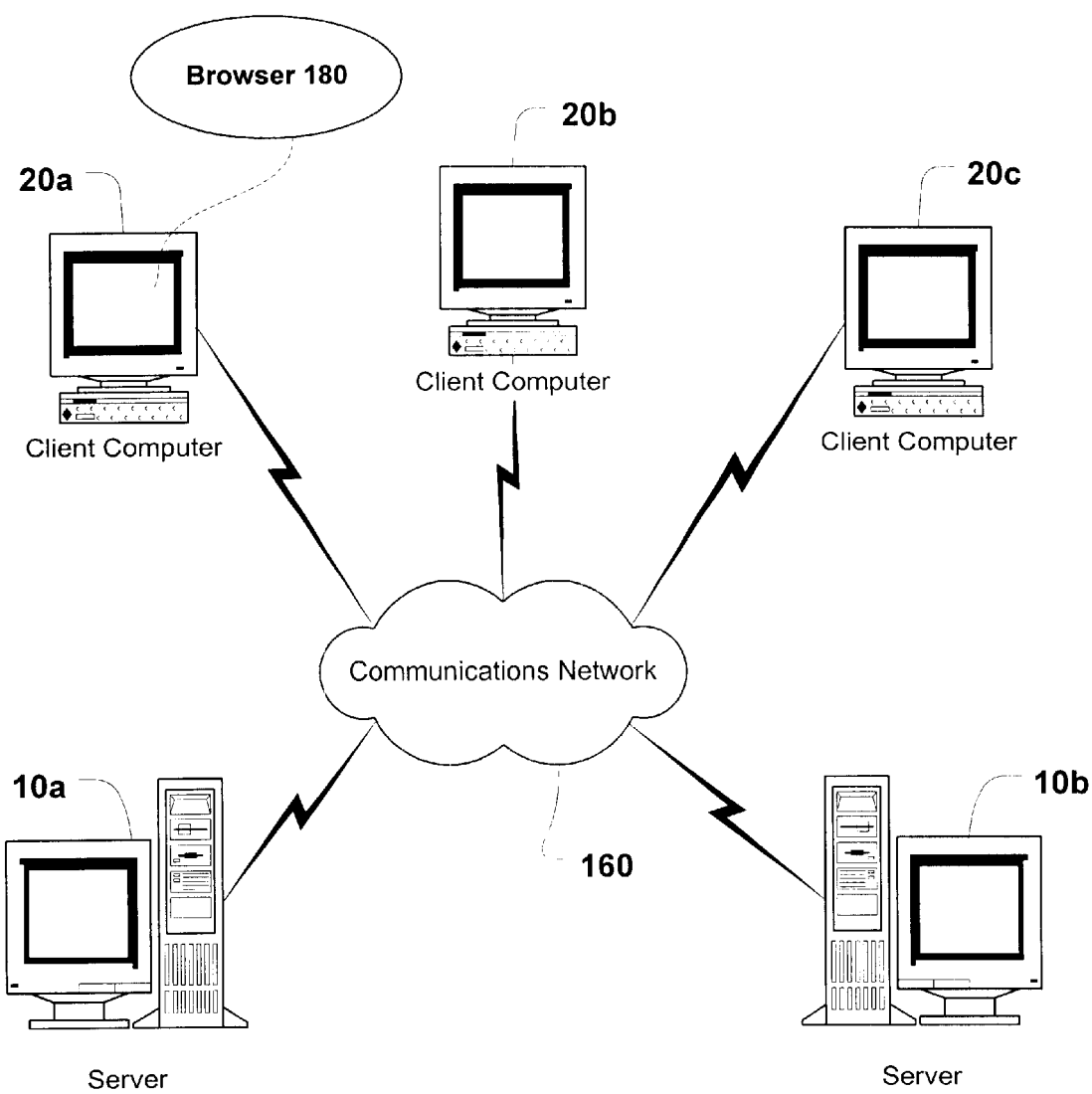
FIG. 1 is a block diagram representing an exemplary network environment with a server in accordance with the present invention.

The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the non-textual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well, as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via TCP/IP connections for high-capacity communication. Active within the client is a first process, known as a "browser," which establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data. Each web page can also be referred to simply as a "page."

The client typically displays the information provided through the network by the server, using a software application known as a browser. Most browsers have modern graphical user interfaces that are capable of displaying and manipulating various types of data. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., typically with a Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with one or more equivalent TCP/IP address.

Free or relatively inexpensive computer software applications such as Internet "search engines" make it simple for a user to find information on a topic of interest or obtain specific content within a content offering, in the case of a directory listing search engine. A person may type in a subject or key word and generate a list of desired results. However, a problem associated with these type of Internet "search engines" is simply dealing with the vast amount of potential data that may be searched and retrieved. By entering certain keywords into such search engines, unwanted data, in addition to the desired data, may be discovered by the search engine, forcing the user to wade through often useless and unwanted search results in order to get to the desired data. From the foregoing it can be appreciated that a need exists for tailoring search engines. By tailoring a search engine to the demographics of a particular user, a user can essentially utilize the search engine to filter unwanted data or information altogether.

The present invention was developed to provide a search engine for directory listing data that offers more relevant and reliable search results. In an illustrative implementation, the search engine is contemplated for use with a business directory, providing listings of businesses. The search engine employs a unique decision matrix that delivers results faster, and more importantly, the "right" results for the user. The engine relies on an algorithmic series of analytical steps, correlation with a weighted taxonomy of categories and keywords, and tuned processing of queries against a physical data store. The taxonomy is structured in manner where third party listing data resides at the lowest level of the taxonomy construct, and predetermined category designations reside at the highest level. Generally, the taxonomy construct provides a means by which similar data may be grouped according to pre-defined categorizations, where the category themselves are associated with each other. The groupings may be represented through various nodes. The nodes having associations with each other and with the individual data maintained with the nodes.

The search engine employs various search processes when processing search queries. These search processes may include the use of keywords, a picker, a chooser, lead nodes (best leaf node), proximity search, bounded search, and business attributes. Keywords are unique synonyms ("shortcuts") for any node in the category taxonomy. For example, the keyword "whiskey" may be a shortcut for a general category describing liquor stores. The picker is part of the search interface where a user is prompted to choose from a list of categories and enter a location preference. The chooser is similar to the picker search interface of the search engine in that it provides the user a list of categories for the desired business listings. However, unlike the picker, the chooser does not accept user location preference data. The chooser may be used to obtain further clarification from the user when a broad search query is submitted or when the location has already been specified.

As mentioned, the taxonomy construct maintains various levels. In an illustrative implementation, lead nodes are tertiary nodes of the taxonomy. Generally leaf nodes may correlate with Industry Standardized Codes (e.g. American Business Information Standard Industry Code (ABISIC), North American Industry Classification System (NAICS)) and ultimately businesses. Herein, Industry Standardized Codes may be defined as codes adopted by industry that assign classification to data elements. For example, business directory information vendors may conform to the accepted standards Standard Industry Code (SIC) or North American Industry Classification System (NAICS). These standards require data to be categorized according to a predefined set of rules. Generally, Industry Standardized Codes provide conformity to data so that the data may be easily used by industry participants. Each of the leaf nodes is provided a weight according to predefined set of rules. Within this taxonomy, higher level nodes are collections of leaf nodes. For example, "used car dealers" may be a leaf node having a parent category of "cars" with a further parent of "transportation." The "best" leaf node is the highest weighted sibling of a set of leaf nodes with an identical parent. Weighting is determined most often by popularity. For example, the highest weighted lead node of parent "cars" might be "car dealers" because it is a more likely initial choice than "car repair" or "auto parts".

The search engine may perform a proximity search to obtain the results set for display to the user. A proximity search may be triggered directly by the user in entering location information exclusively in the search interface dialog, or by the search engine itself if the direct business name results in no matches. When executing a proximity search, the search engine plots a latitude/longitude centroid (i.e. a central reference point) and conducts a search within a predetermined radius of the plotted centroid. In order for a business to be part of the result set of businesses listed, the distance between the centroid and position of the discovered business must satisfy pre-determined search criteria. Comparatively, the search engine may employ a bounded search to find the desired information. In a bounded search the search engine uses any given zip code or collection of zip codes (i.e. neighborhood, city, or state) to conduct the search for the desired business listing. Similar to the other operations above, businesses that match the search criteria submitted by the search interface through a bounded search are displayed to the user.

In addition, the search engine my perform searches on the business listings store using business attributes. That is, a business may have unique attributes that may separate it from other businesses. Extended business attributes may include, brands carried by the business, special services, parking, or accepted payment methods. The search engine process a user's search query by looking for these extended business characteristics.

In an illustrative implementation, the search engine of the present invention may implemented in the Microsoft® MSN.COM Yellow Pages (YP) business directory search service. In operation, the YP search service provides users with a simple to use click through graphical interface that accepts search queries directed to business listing information. The YP search engine cooperates with a database having business listing information stored according to a pre-defined data taxonomy. The taxonomy is structured such that there are numerous interrelated and associated category levels that contain pre-defined business classification and business listings information. Using a series of pre-defined rules, the YP search engine searches the business listing store employing taxonomy based processes and tries to find either direct matches or matches that may proximate in distance and character to the submitted query.

As will be described below with respect to FIGS. 1–6F, the present invention is directed to a system and methods for the searching of directory listing information hosted on a computing system. In accordance with an illustrative embodiment thereof, the present invention comprises a system and method to provide users the ability to search of directory listing information for desired listing information.

In one embodiment, described more fully hereinafter, the methods and apparatus of the present invention may be implemented as part of a computer network such as the Internet having a plurality of server computers representing Internet content providers hosting content, such as Internet domains. Further, a plurality of users (i.e. client computers)

are connected to the computer network through computer hardware and software (e.g. Web browsers) such that the user may request, transmit, and receive Internet content. Although the depicted embodiment provides a system and method for searching business directory listing information employing the Internet, those skilled in the art will appreciate that the inventive concepts described herein extend to business directory searching systems and methods utilizing computer systems having various configurations.

Illustrative Computer Network Environment

The present invention may be deployed as part of a computer network. In general, the computer network may comprise both server computers and client computers deployed in a network environment. FIG. 1 illustrates an exemplary network environment, with a server in communication with client computers via a network, in which the present invention may be employed. As shown in FIG. 1, a number of servers 10a, 10b, etc., are interconnected via a communications network 160 (which may be a LAN, WAN, intranet or the Internet) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser 180 to gain access to the servers 10.

Thus, the present invention can be utilized in a computer network environment having client computers for accessing and interacting with the network and a server computer for interacting with client computers. However, the systems and methods for providing more relevant directory listings search results of the present invention can be implemented with a variety of network-based architectures, and thus should not be limited to the example shown. The present invention will now be described in more detail with reference to a presently illustrative implementation.

Illustrative Search Applications

Figure 2:
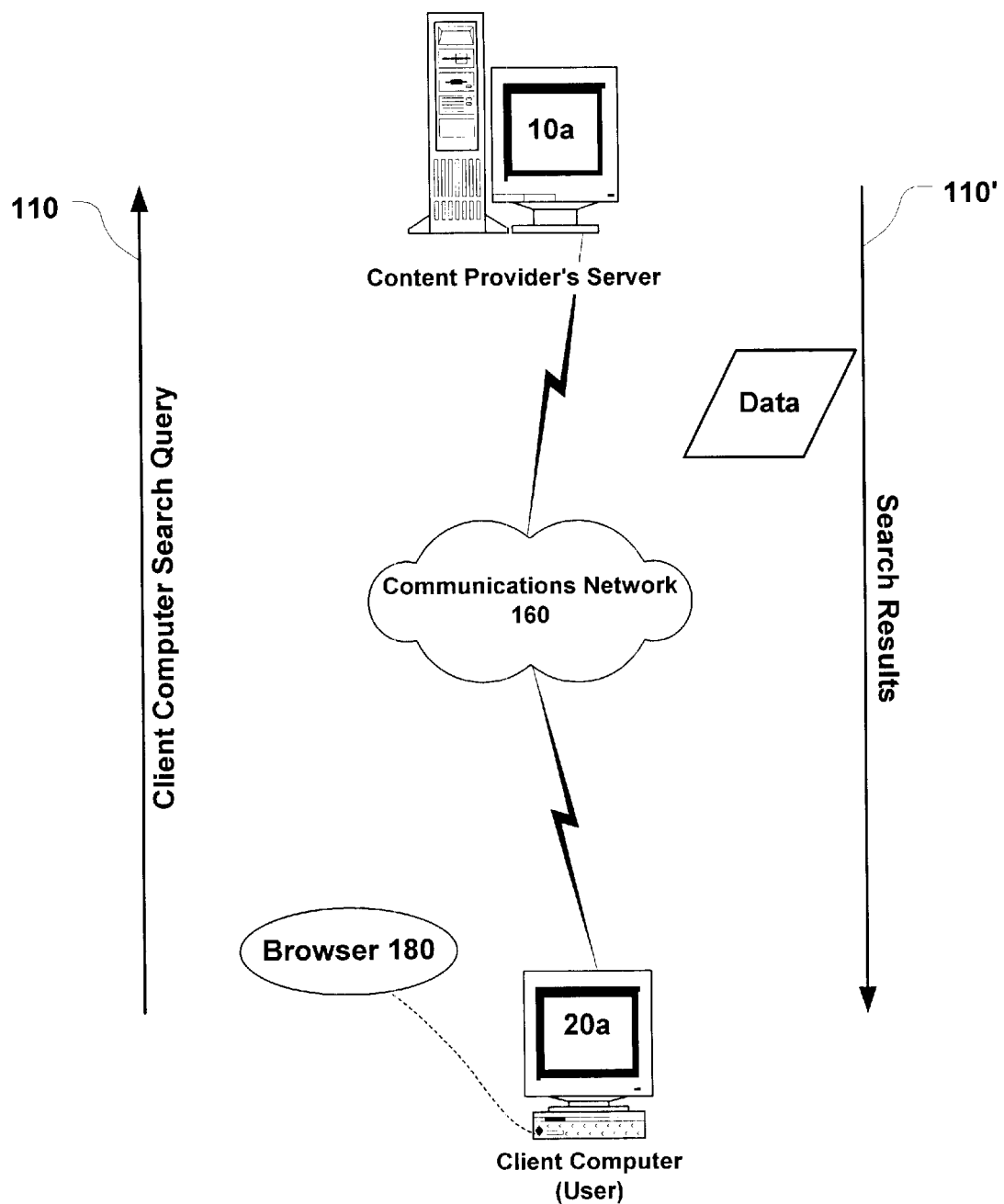
FIG. 2 is a block diagram of the interaction between a client computer and a server computer of exemplary computer network of FIG. 2 when transmitting search related data in accordance with the present invention.

FIG. 2 shows the interaction between client computer 20a and content provider's server 10a. As shown, client computer 20a is maintains browser application 180. Further client computer 20a is electronically coupled to communications network 160. Similarly, content provider's server 10a is electronically coupled to communications network 160. In operation, client computer 20a may communicate information to content provider's server 10a over communications network 160 and vice versa. For example, client computer may send search query 110 for processing by content provider's server 10a over communication 160. In response, content provider's server 10a process search query 110, and transmit back to client computer 20a over communications network 160 search results 110'. Search results 110' may comprise various data 110'(a) that may be processed and displayed by browser 180 on client computer 20a.

Figure 3:
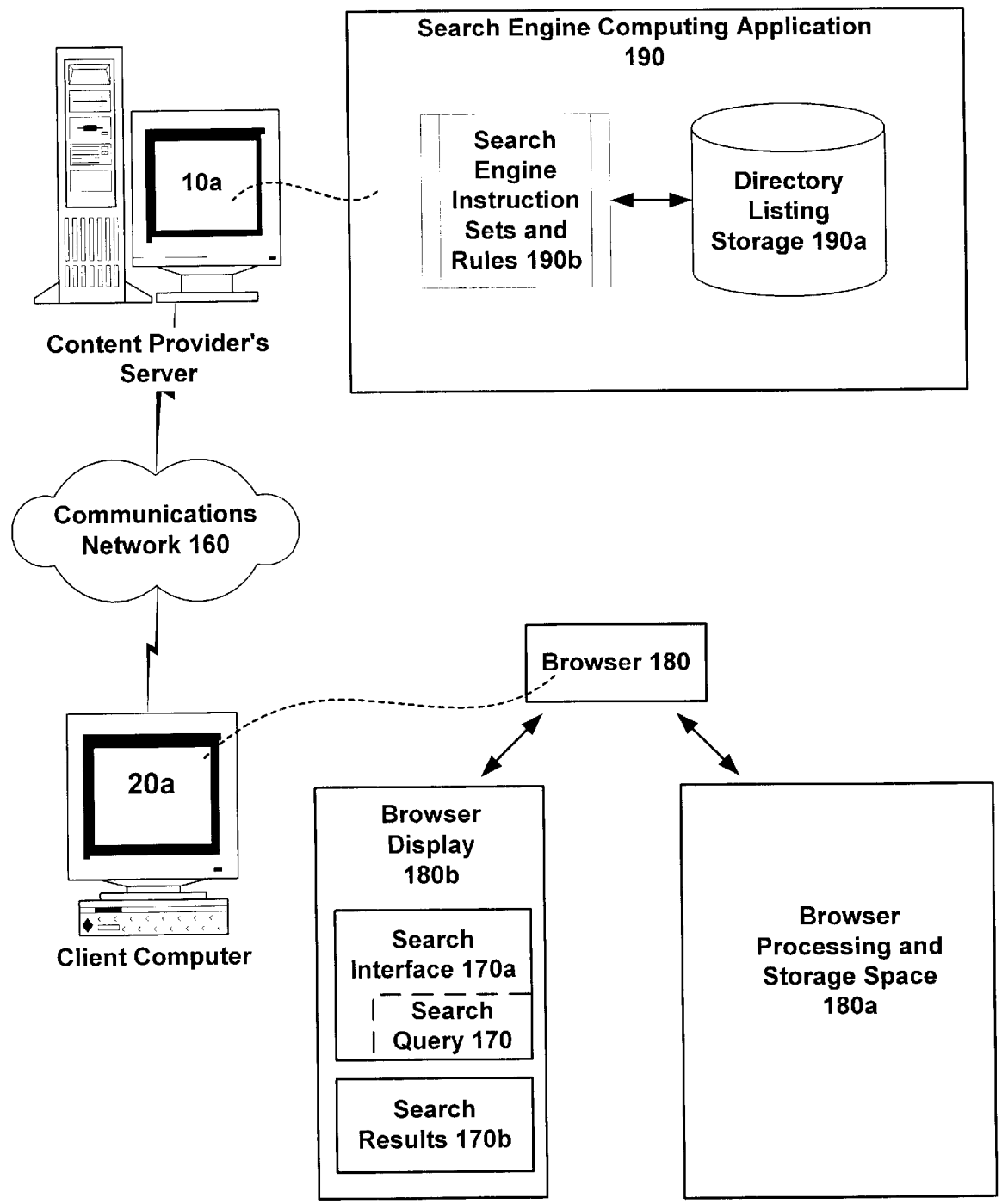
FIG. 3 is a block diagram of the components of the computing applications and utilized by an illustrative client computer and server computer in accordance with the present invention.
Figure 4:
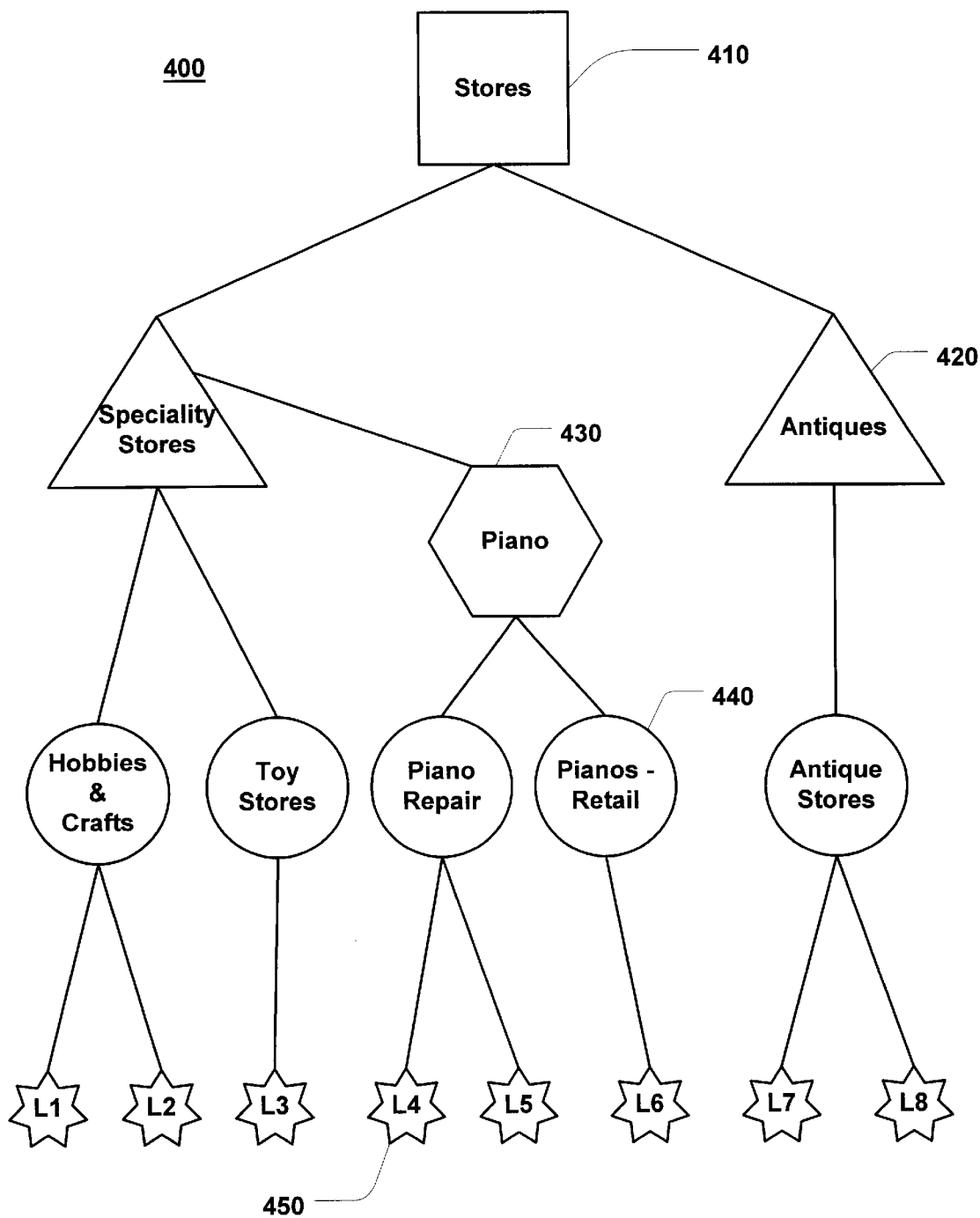
FIG. 4 is a block diagram of an illustrative data taxonomy for the categorization of listing data contemplated for use by the present invention.

FIG. 3 shows the components with client computer 20a and content provider's server 10a to realize the exchange of information described by FIG. 2. As shown, client computer 20a maintains browser 180. Browser 180 comprises browser processing and storage space 180a and browser display 180b. Data may be received by client computer 20a and passed to browser 180. In turn, browser 180 processes the data in browser processing and storage space 180a for display on browser display 180b. Further, FIG. 4 shows content provider's server 10a maintaining search engine computing application 190. Search engine computing application comprises directory listing storage 190a and search engine instructions sets and rules 190b. Directory listing storage 190a cooperates with search engine instructions sets and rules 190b such that listing data is retrieved from directory listing storage 190a according to search engine instruction sets and rules 190b.

In operation, client computer 20a may accept search query 170 from a cooperating user (not shown) through search interface 170a of browser 180. In turn, browser processing and storage space 180a may process search query 170 so that it may be communicated to content provider's server 20a over communications network 160 for processing. Content provider's server 10a may receive search query 170 and pass it to search engine computing application 190 for processing. Search engine computing application 190 processes search query 170 to retrieve relevant search results 170b using search engine instruction sets and rules 190b. Search results 170b are gathered by search engine computing application 190 and communicated to browser 180 of client computer 20 over communications network 160. Browser 180 displays search results 170b in browser display 180b.

Figure 3A:
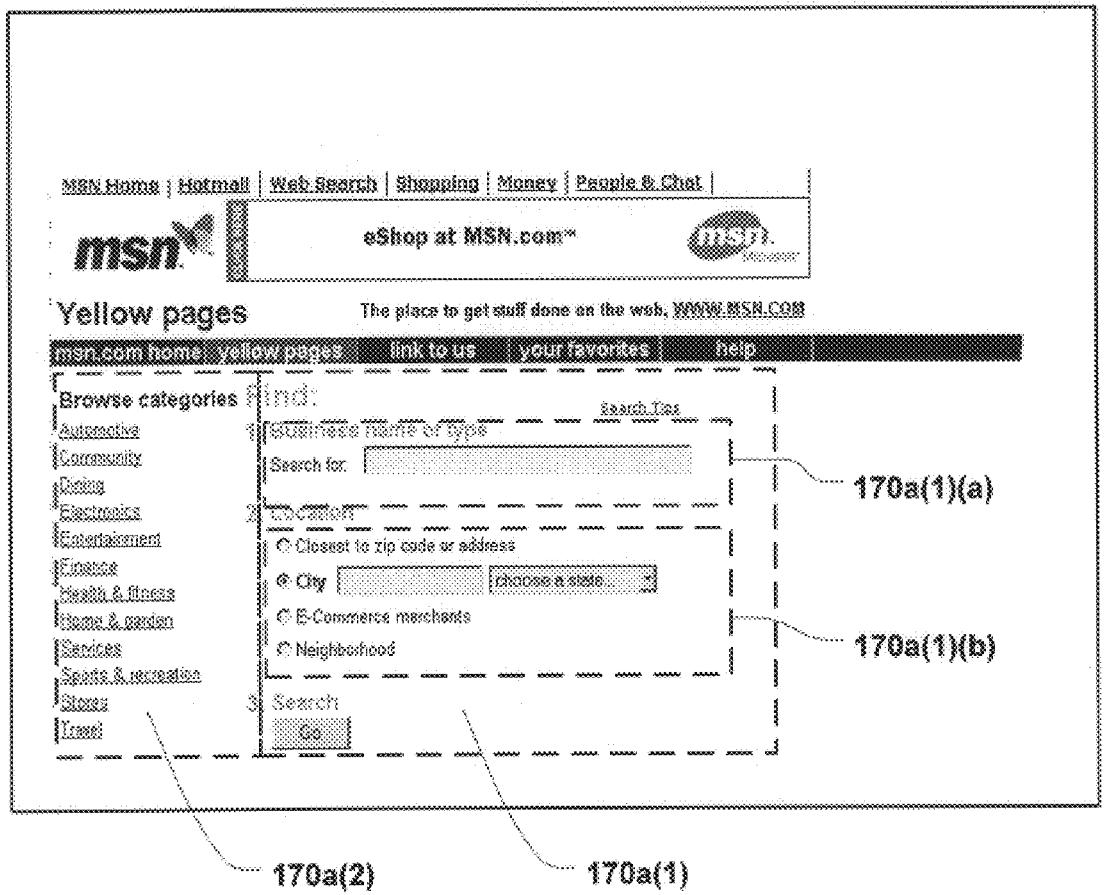
FIG. 3A is a screen shot of an exemplary display pane showing an illustrative search query interface in accordance with the present invention.
Figure 3B:
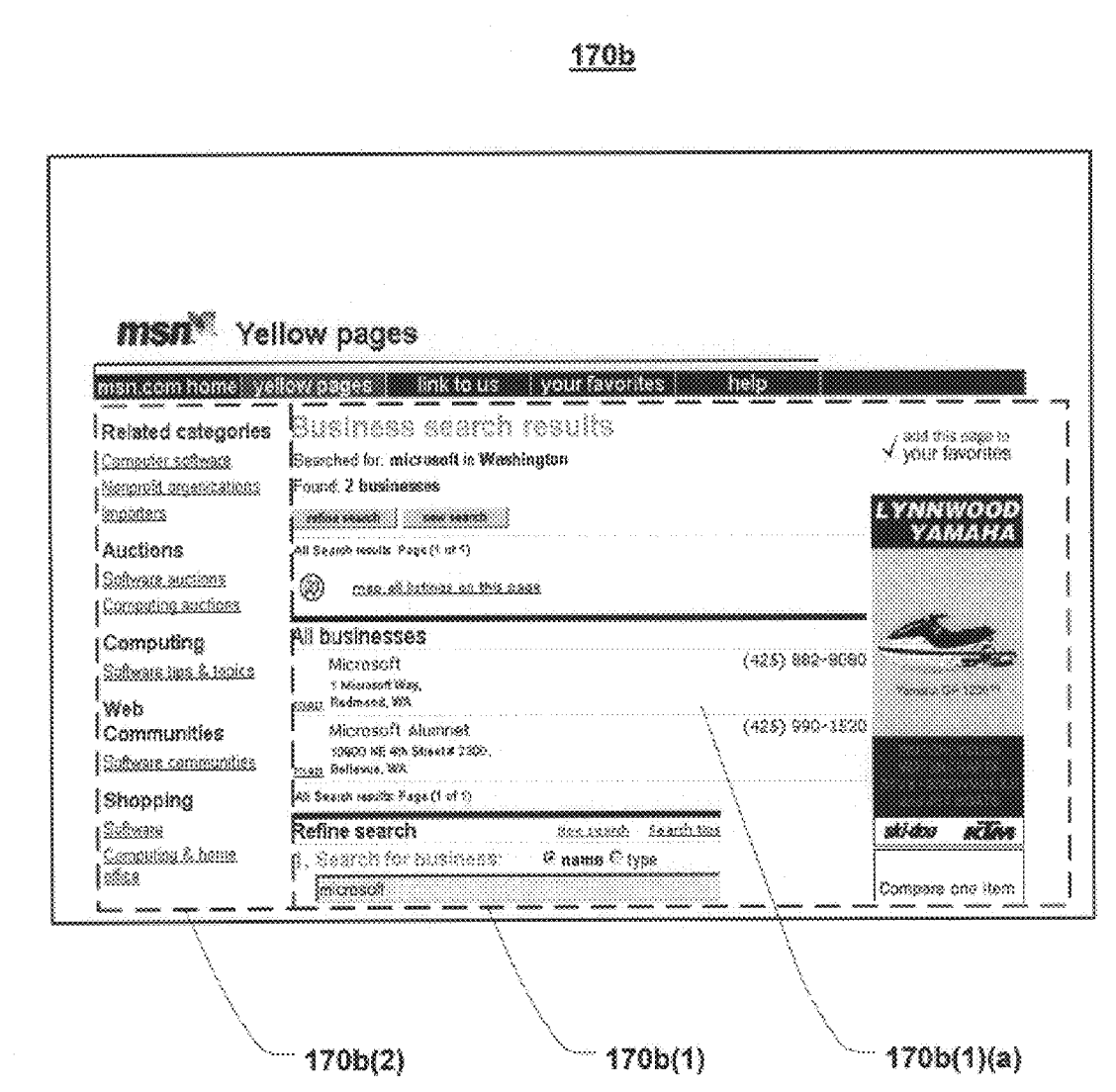

FIG. 3A shows search interface 170a being implemented as a pane of an exemplary browser computing application 180. Search interface 170a generally comprises main interface area 170a(1) and side interface 170a(2). Main interface area 170a(1) may support several dialog boxes and controls by which a user (not shown) may input search query information. For example, main interface area 170a(1) may contain business name or type search dialog box 170a(1)(a) that allows users to search business directory listings using the business name. Additionally, main interface area 170a(1) may support location search dialog box 170a(1)(b) that offers cooperating users (not shown) the ability to enter location based search queries for searching business directory listings. As, shown the side interface area may support controls directed to searching business directory listing information by navigating predefine category levels. These category levels may directly correlate to a taxonomy level of the data store. FIG. 3B shows search results 170b being implemented as a pane of exemplary browser computing applicaton 180. Search results 170b may comprise a main results display area 170b(1) and side results display area 170b(2). Results 170b(1)(a) that directly or most closely satisfy a user's (not shown) search query may be displayed in main results display area 170b(1). Comparatively, related search results 170b(2)(a) may be displayed in side results display area 170b(2). As shown, main results display area 170b(1) and 170b(2) may provide additional controls and search query options to further refine a user's (not shown) initial search. Search engine computing application 190 (of FIG. 4) may process a user's (not shown) search query for business directory listing information through a bounded search (i.e. a search using a user's inputted demographic information) or a proximity search (i.e. a search within an a predefined geographic distance from a user's location). The type of search performed may depend on the information provided by the participating user. That is, a user may input information indicative of a bounded search (i.e. inputting city or state name). If the bounded search produces failures the search may degrade to a proximity search. When processing an inputted search query, search engine computing application 190 (of FIG. 4) may first look for the desired business listing within the user's (not shown) specific geographic position (i.e. within a specified zip code). If the business listing is not found within this specified geographic position, search engine computing application 190 may perform a proximity search to find the business listing in surrounding geographic areas. The proximity process may consist of creating a centroid geographic position that is relative to the user's (not shown) geographic position and searching for business listings within a pre-defined area relative to the created centroid. The approximate location of a business may be redundantly located using a predefined data type. In an illustrative implementation, the data type may take the form of "InterleavedLatitudeLongitude", an instance of the well-known data type HHCODE. Generally, the data type partitions the space of businesses into 2 dimensional buckets (i.e. divides the targeted country into small grids, with nearby grids having numbers close to one another per the design goals of data type).

When conducting a proximity search, the radius of interest may be approximated within 9 squares. Each square may contain a power of 2 of grid codes (e.g. 9 1×1 boxes, or 9 2×2 boxes, or 9 4×4 boxes, etc.). The power of two sized squares are aligned with equally sized power of two squares on the underlying grid. In doing so, the 9 squares may be represented by four continuous ranges of grid codes. These ranges of grid codes provide candidate businesses (i.e. businesses that are proximate to the desired radius from the target). The candidate businesses may then be pruned down to arrive at a resultant set that maintains those businesses that are truly within the desired radius. The pruning process may be achieved by consulting the exact latitude and longitude of the resultant businesses.

If a specific radius has been requested, the processing is generally completed after the first search. In the scenario that the "nearest 20" businesses from a target location are sought a first search within a small radius (a few blocks wide) is performed and then the search radius is doubled or quadrupled depending on how many businesses are found in each of the searches.

Generally, the search radius may be projected depending on the number of results that are returned. In an illustrative implementation, the radius may be increased up to 25 miles or until 20 businesses are successfully found, whichever comes first.

Figure 3C:
FIG. 3C is a map that illustrates the concept of a geographic centroid in accordance with the present invention.

FIG. 3C shows an exemplary map 170c that may be used by search engine computing application 190 (of FIG. 4) when performing the proximity search. As shown map 170c may contain a centroid 170c(1) and centroid area 170c(1). Map 170c may be utilized by search engine computing application 190 in the following manner. For example, a user may be located between Spokane and Pullman and would like to find business directory listing information for a particular auto repair shop relative to his/her geographic position. Search engine computing application 190 (of FIG. 4) may create centroid 170c(1) based the user's (not shown) geographic position and search for businesses within a predefined area 170c(2) relative to centroid 170c(1).

FIG. 4 shows exemplary data taxonomy 400 for data stored in directory listing storage 190a (of FIG. 3). Data taxonomy 400 has various levels 410 (top level), 420 (second level), 430 (third level), 440 (leaf nodes), and 450 (directory listing level). These levels are related in such a manner that data residing in level 410 acts as a parent to data found in level 420. Similarly, data that resides in level 420 may act as parents to data found in level 430 or data found in level 440. Accordingly, data found in level 450 may be children of data found in level 440. As shown, each of the various levels may contain a number of data elements. When implemented the lowest level 450 may contain the actual business directory listing information. Correspondingly, level 440, the parent to data of level 450, may serve to categorize the business directory listing information (Industry Standardized Codes, e.g. ABISIC, NAICS directory listings) according to editorialized detailed category designations. Similarly, level 430 may serve to provide broader category designations for category designations of level 440. Level 420 may provide even broader categorization for data found in levels 430 or 440. Lastly, level 410 may provide the broadest category designations for data of level 420.

Data taxonomy 400 is better described by the following example. For example, level 410 may provide the broad category designation of "stores". Within this category designation, therein may exist more specific categories, such as, "specialty stores" and "antiques" found in level 420. Further "specialty stores" may encompass more specific categories, such, as "piano" stores as found in level 430 or alternatively "hobbies & crafts" and "toy stores" found in level 440. The "piano" stores category description of level 430 may act to broadly describe more specific categories "piano repair" and "pianos-retail" stores of level 440. Similarly, the "antiques" category descriptor of level 430 may act to describe the more specific category of "antique stores" of level 440. In turn, "antique stores" may act as a parent or category descriptor for business listings L7 and L8 of level 450. Similarly category descriptors "hobbies & crafts", "toy stores", "piano repair" and "pianos retail" may serve as category descriptors of ABISIC base business listings L1 and L2, L3, L4 and L5, and L6, respectively.

Figure 5:
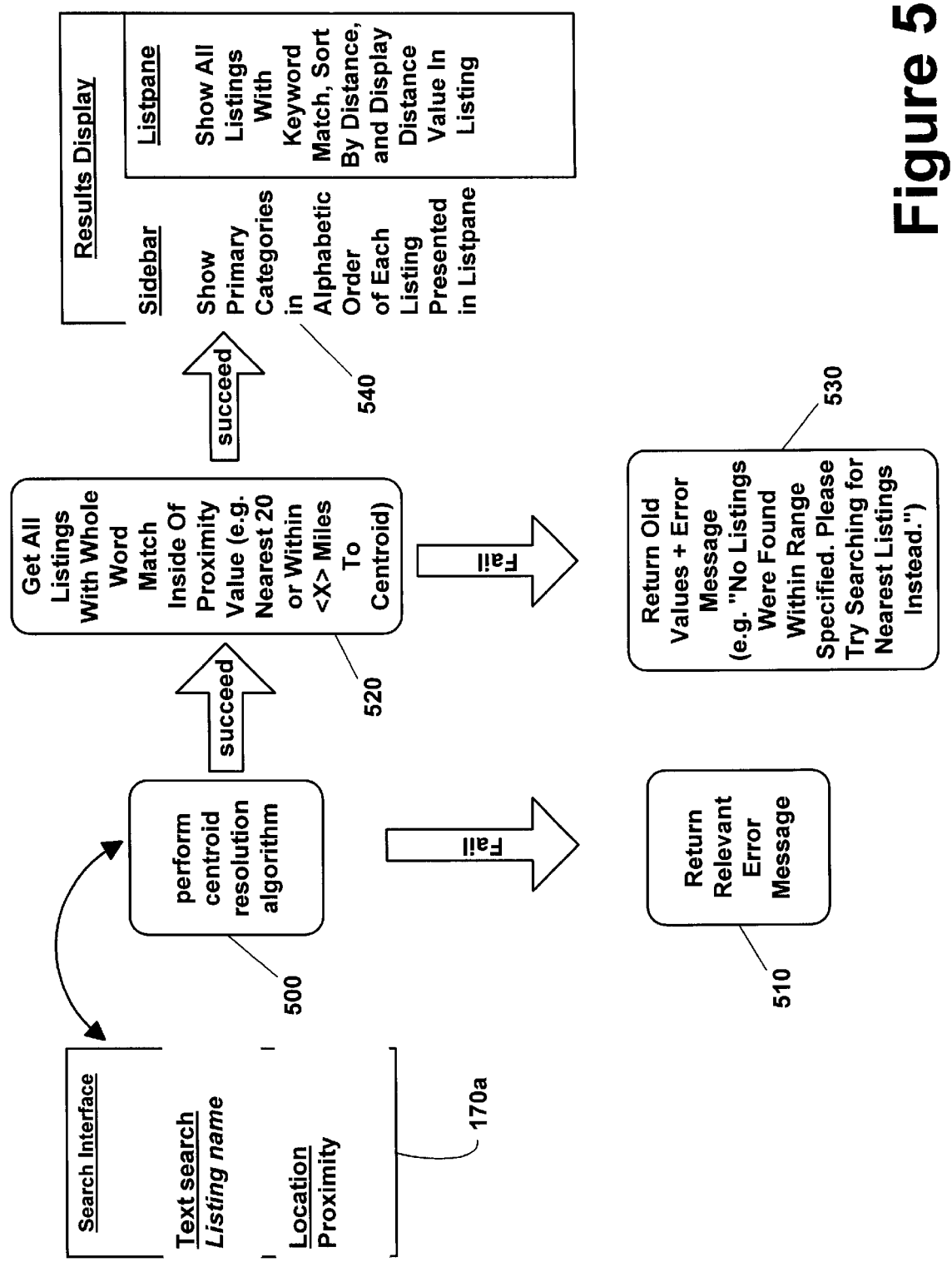
FIG. 5 is a flow diagram of the processing performed by the present invention when processing a search query offering a listing name using a proximity search.

In operation, data taxonomy is utilized by search engine computing application 190 to retrieve the most relevant directory listing information to satisfy search queries. In having the data stored according to this exemplary taxonomy, business listings may be more easily retrieved in a number of different manners. The various levels within the taxonomy allow for the existence of various associations among the data such that searches may be performed to capitalize on these associations. In addition, the taxonomy deployed provides advantages that improve search operations and enhance users' search experiences. For example, the taxonomy allows for the creation of two distinct business listing information trees. The canonical tree presents to users all of the business listing information without editorial commentary. This tree may have a small number of levels from the broadest category nodes to the actual business listings. Conversely, the editorial tree has a larger number of category levels. The editorial tree presents business listing information according to editorialized categories (nodes) and keywords. By having these varied taxonomy trees, the search operation is optimized. That is, the search engine of the present invention may operate on the tree with which it will have more success. In some instances, the canonical tree is preferred over the editorial tree. Further, users' experience is enhanced by having these trees. That is, users may choose to search for their desire business listing using category names. If they are left to perform their search using the canonical tree, their search may be rather cumbersome. By providing users access to the editorial tree, users may more easily search for the desired business listing. Further, the editorial tree allows editors to associate advertisements for other products and services with any of the business listings such that a user searching for employment agencies may be presented with advertisements for apartment rental agents. FIG. 5 shows the processing performed by search engine computing application 190 (of FIG. 3) when processing a search query offering requesting a specific listing within a specified distance range (i.e. location). As shown the search query data from the search interface 170a is passed to the processing portion of search engine computing application 190. The centroid resolution algorithm is performed at block 500. The centroid resolution algorithm may first call a map object so that it may relate a centroid in accordance with a predefined map. From there, the algorithm may calculate the latitude and longitude of the centroid (reference point). The centroid latitude and longitude may then be used when processing searches to locate business listings (having their own latitude and longitude) that are proximate (according to latitude and longitude) to the calculated centroid. If the algorithm fails an error message is returned to a cooperating user (not shown) in search results 170b (of FIG. 4B). Alternatively, if a centroid may be resolved, processing proceeds to block 520 where the search engine computing application 190 sorts through the data of directory listing storage 190a (of FIG. 3) to retrieve all of the listings with whole word matches within a predefined proximity value (e.g. nearest 20 or within <x> miles from centroid). If this search is unsuccessful in finding any business listing with the listing name offered in the search query, search engine computing application proceeds to block 530 where the initial listing is displayed to the user (not shown) with an error message (e.g. "No listings were found within range specified. Please try searching for nearest listings instead."). However, if the search of block 530 is successful, search engine computing application populates search results 170b (of FIG. 4) at block 540 with relevant results such that all listings with a keyword match (as sorted by distance) are displayed in the main search results area 170b(1) (of FIG. 3B) and all of the primary categories (i.e. data of data taxonomy 400 that are associated with the search results) are displayed in side search results area 170b(2) (of FIG. 3B).

Figure 6:
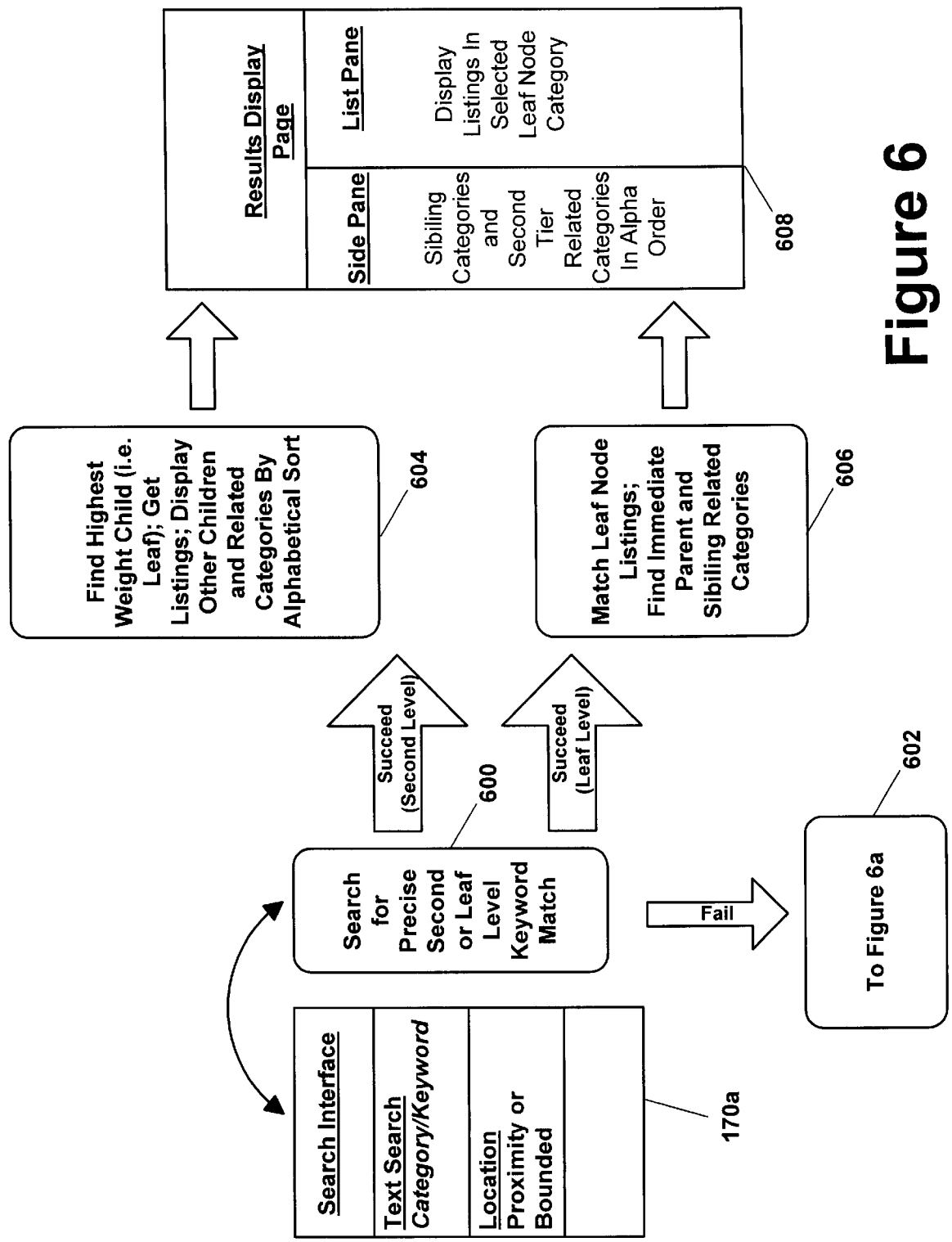
FIGS. 6–6F are flow diagrams of the processing performed by the present invention when processing a search query offering a category or keyword using a proximity or bounded search.
Figure 6A:
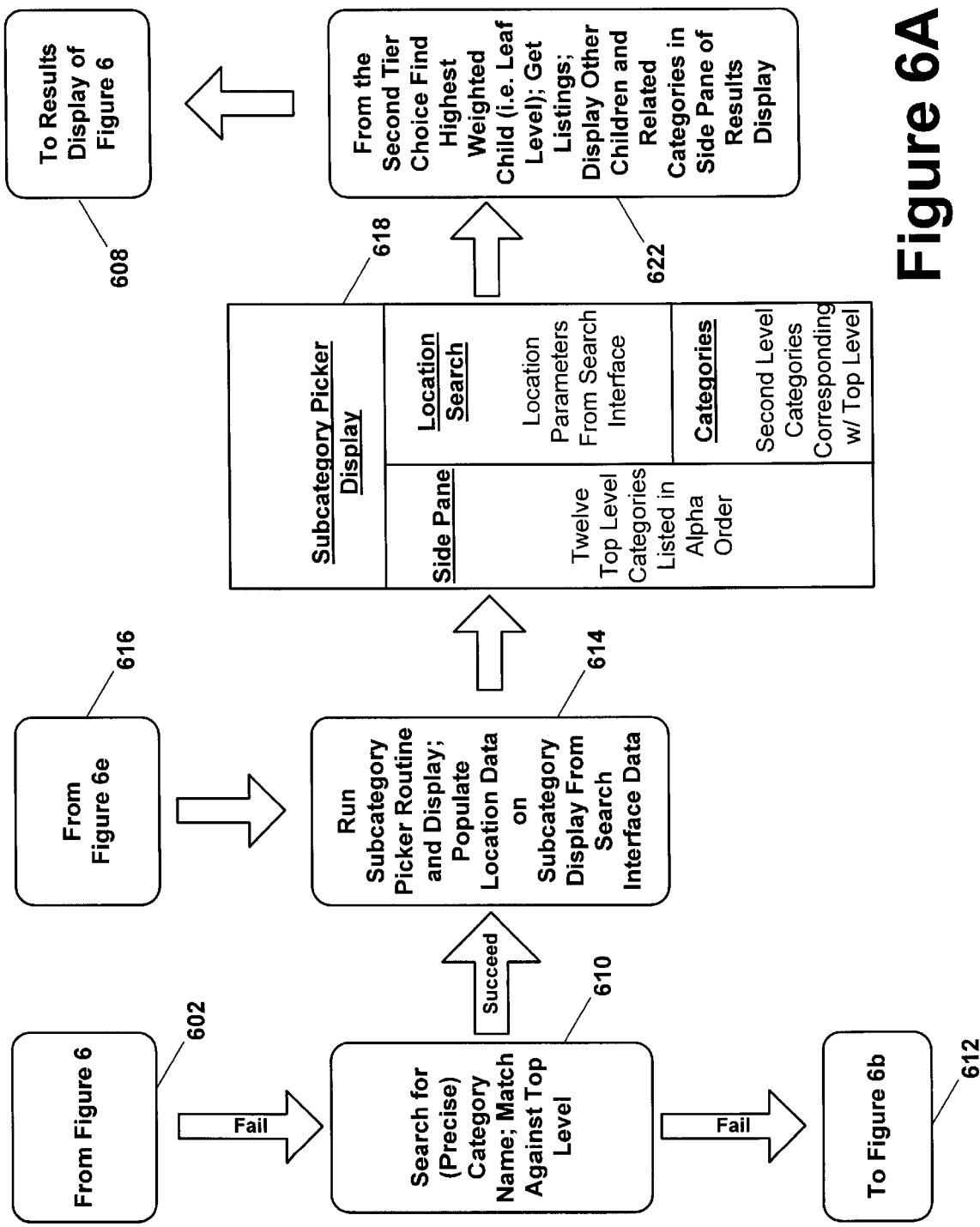
Figure 6B:
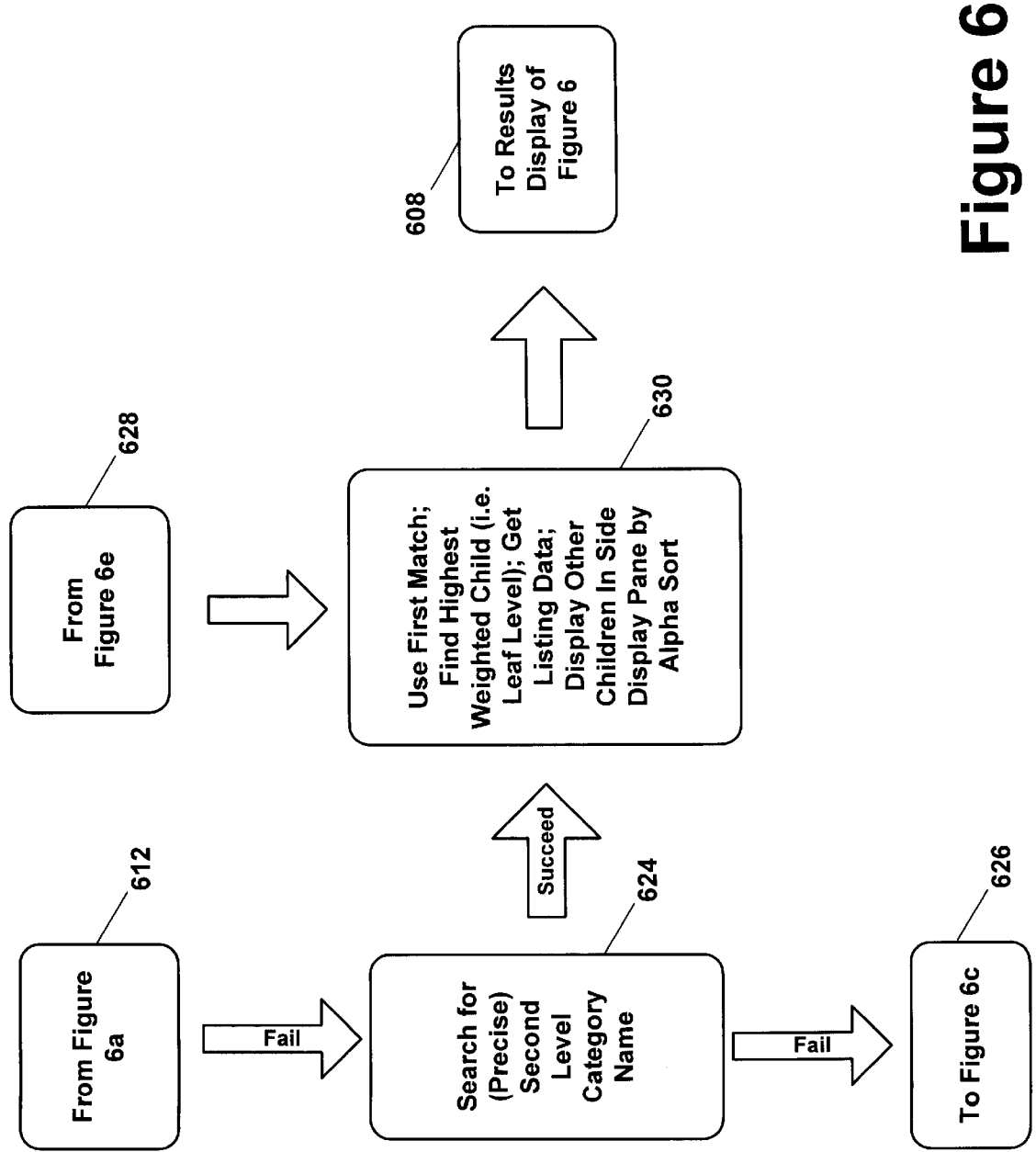
Figure 6C:
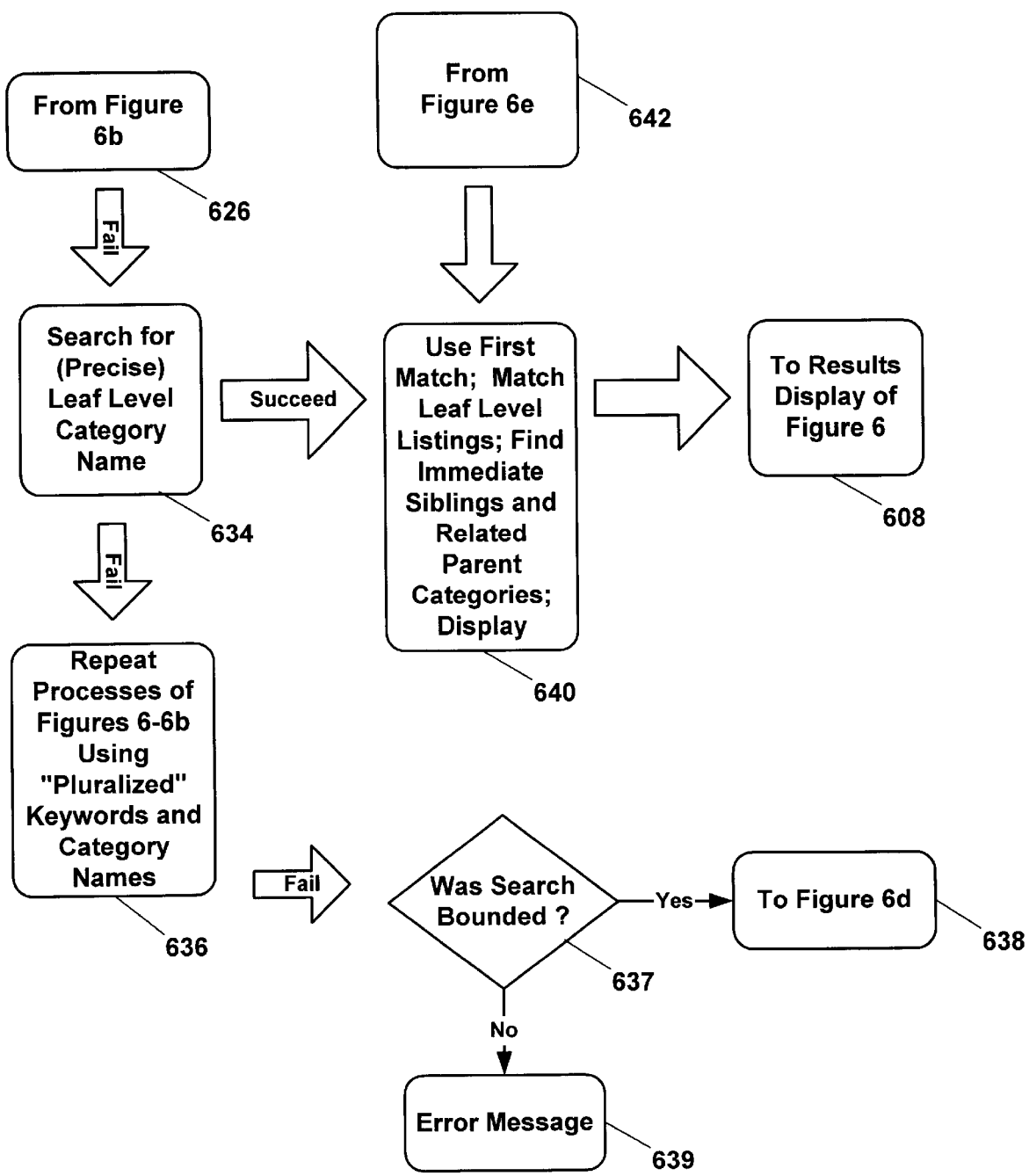
Figure 6D:
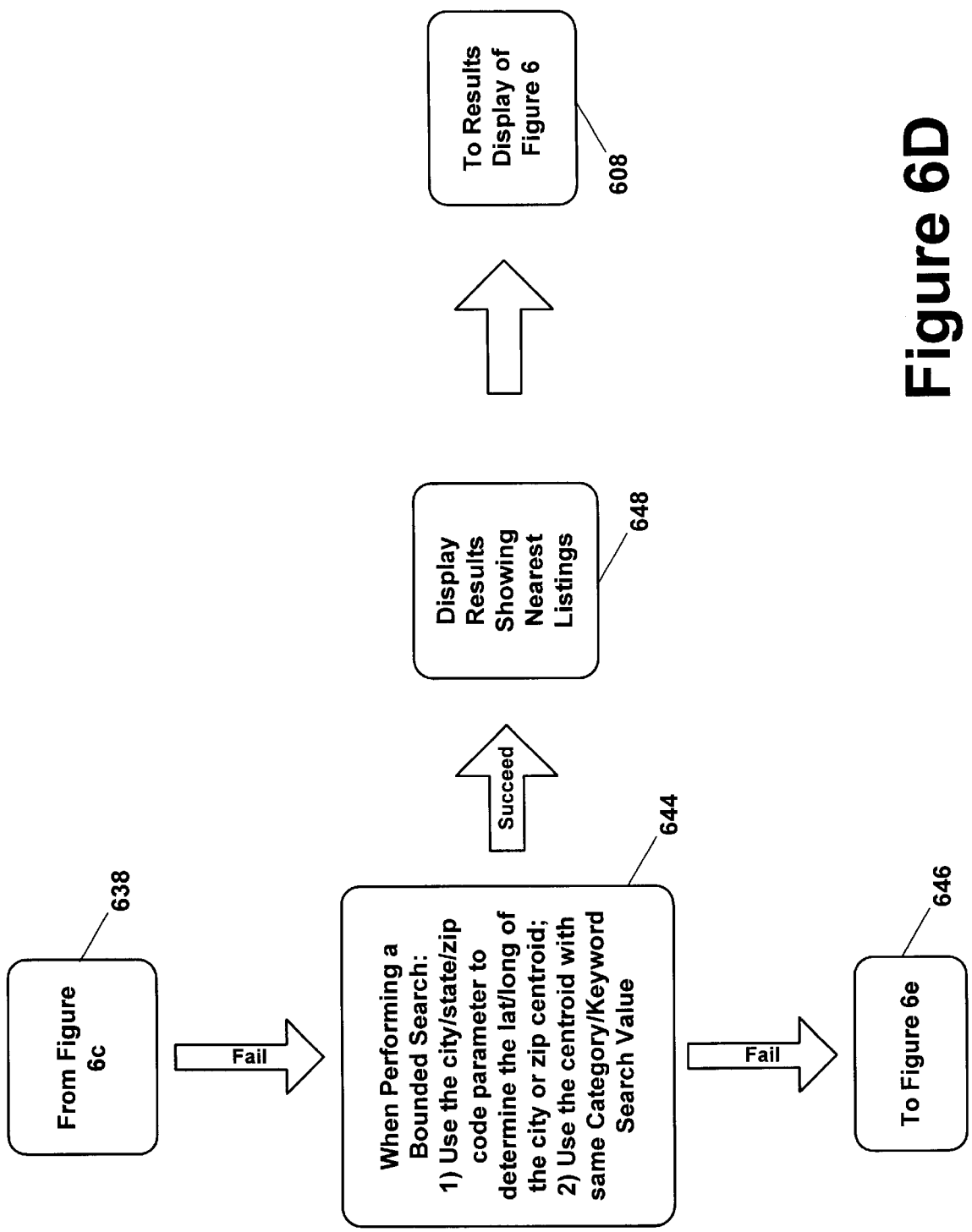
Figure 6E:
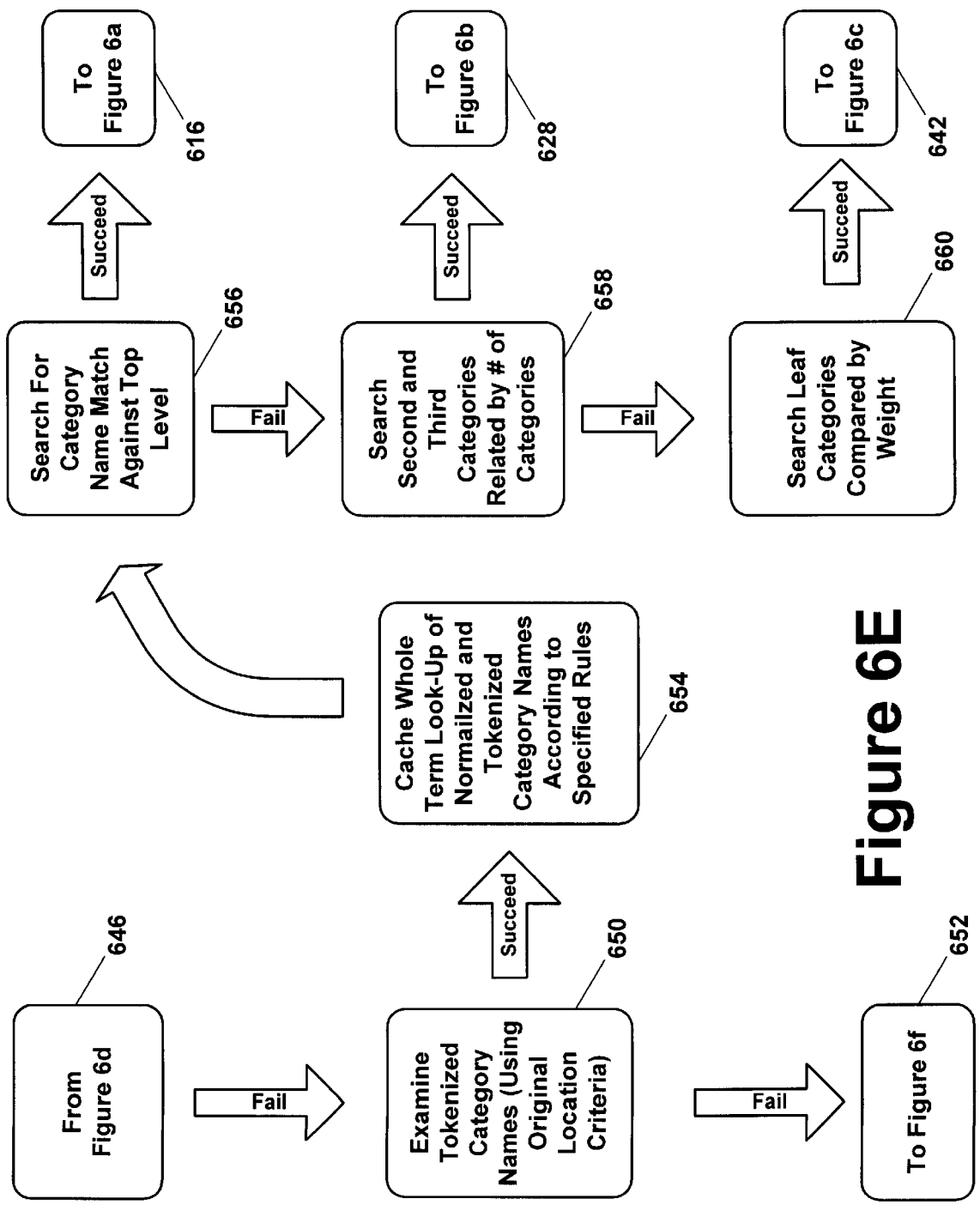
Figure 6F:
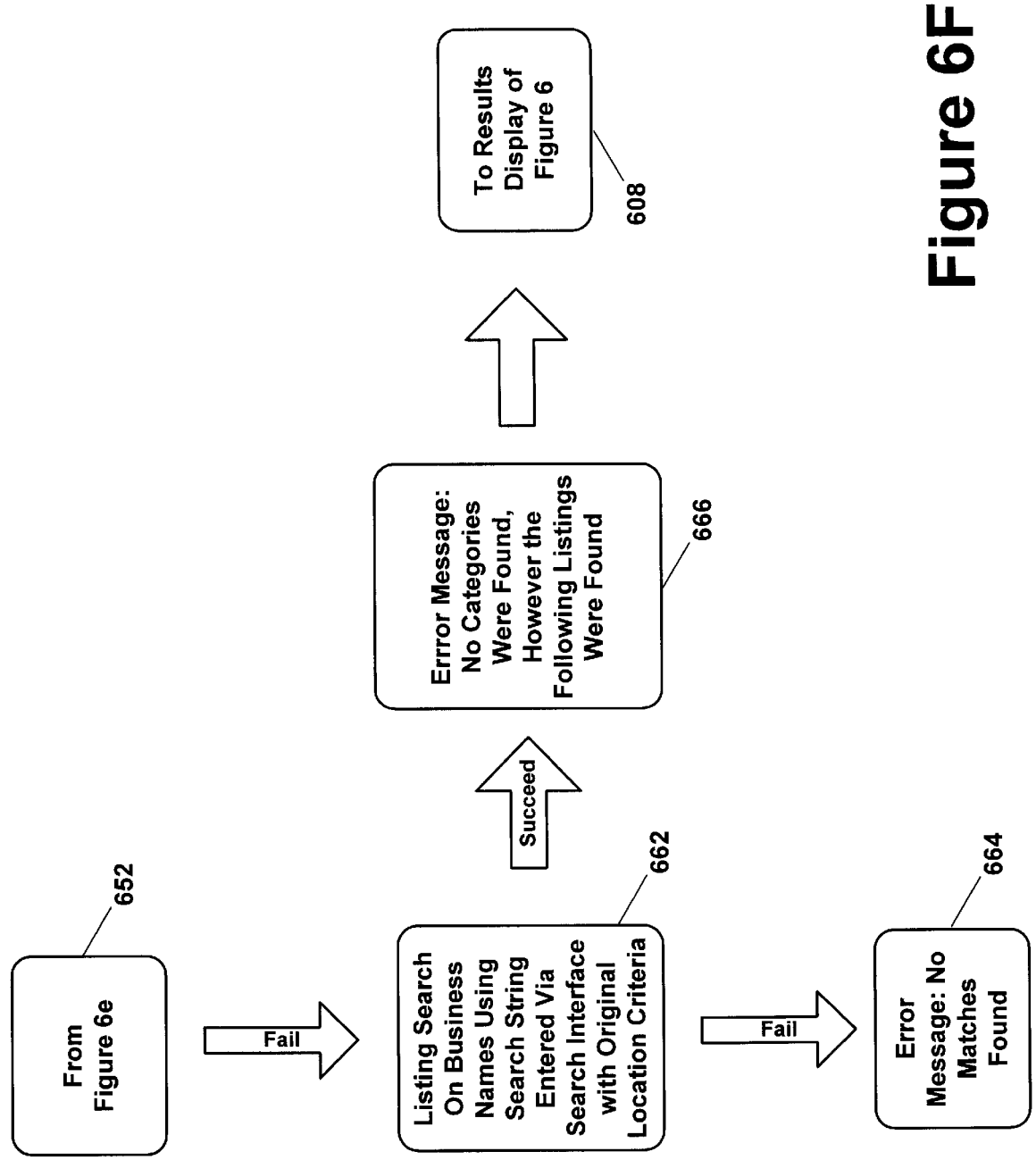

FIGS. 6–6F describe the processing performed by search engine computing application 190 when performing a category or keyword search. As FIG. 6 shows, search query information is passed from search interface 170a to search engine computing application 190 (of FIG. 3). A search is performed at block 600 on directory listing storage 190a for precise second or leaf level keyword match. If the search is successful providing a second level match, processing proceeds to block 604 where the highest weighted child (i.e. leaf node) is retrieved. In addition, other related children are retrieved for display at block 608. Alternatively, if the search of block 600 is successful providing a lead level match, processing proceeds to block 606 where listings within the matched leaf node, as well as, the immediate parent and sibling related categories are retrieved for display at block 608. The display block 608 provides that business listings of the retrieved leaf node categories are to displayed in main search results area 170b(1) (of FIG. 3B) and sibling categories and second tier related categories are to be displayed (in alphabetical order) in side search results area 170b(2) (of FIG. 3B). However, if the search of block 600 is unsuccessful, processing proceeds to block 610 of FIG. 6A.

As shown in FIG. 6A, a search of directory listing storage 190a is performed at block 610 by search engine computing application for a precise category name. This search contemplates matching the search query against top level 410 of data taxonomy 400 (of FIG. 4). If this search is successful, the subcategory picker routine is performed at block 614 and further user (not shown) information is requested at block 618. In addition, location data about the subcategory is retrieved from the search query information and displayed at block 618. Display block 618 provides a user interface that is displayed to the user (not shown) on display 180b of browser 180 (of FIG. 3). This interface prompts the user to input additional search query information by choosing categories. Display block 618 provides that a location search, second level categories (i.e. categories that correspond with top level 410 of data taxonomy 400 of FIG. 4), and an alphabetized list of top level categories be displayed to the user. Based on the category chosen by the user (not shown) from display 618, the highest weighted child is retrieved at block 622 for display at block 608 (of FIG. 6). In addition, block 618 provides that other related categories and listings are retrieved for display at block 608. Related categories may include subcategories of the category displayed. For example, a user searching for the category "Restaurants" may be provided the "Restaurant" category and, in addition, may be provided the related categories of "French", "Italian", "Spanish", etc. However, if the search performed at block 610 is unsuccessful at finding a relevant match, processing proceeds to block 624 of FIG. 6B.

As shown in FIG. 6B, search engine computing application 190 (of FIG. 6) performs a search of directory listing storage 190a for the precise category name among the second levels 420 of data taxonomy 400 of FIG. 4. If this search is successful, the highest weighted child (i.e. leaf level 440 of data taxonomy 400 of FIG. 4) is retrieved along with other related less weighted children for display at block 608 of FIG. 6. However, if the search performed at block 624, processing proceeds to block 634 of FIG. 6C.

FIG. 6C shows search engine computing application 190 performing as search for the inputted category name among the leaf level category names at block 634. If this search is successful, the first match obtained is used at block 640. In addition, related leaf level listings are matched as well as immediate siblings and related parent categories are retrieved at block 640 for display at block 608 of FIG. 6. However, if the contrary is true and the search of block 634 proves to be unsuccessful a search is performed according to the processes described in FIGS. 6, 6A and 6B using pluralized versions of the inputted search queries at block 636. If all of these subsequent searches prove unsuccessful, a check to is performed at block 637 to determine whether if the initial search query was bounded (i.e. qualified with user's demographic information). If the initial search query was bounded processing proceeds to block 644 of FIG. 6D. If the contrary is true, an error message is displayed at block 637 to the user via search results 170b of FIG. 3B.

As shown in FIG. 6D, the city/state/zip code parameter of the search query information is retrieved to determine the latitude and longitude of the city or zip code centroid at block 644. This centroid is used to perform a search using the initial category/keyword search at block 644. If this search is successful (i.e. there are business listings that have matching category/keyword within the calculated centroid area), the listings are retrieved at block 648 for display at block 608 of FIG. 6. However, if the search performed at block 644 is unsuccessful, processing proceeds to block 650 of FIG. 6E.

FIG. 6E shows search engine computing application 190 examining the tokenized category names for a match using the original location criteria at block 650. The category names may be tokenized, such that, they are filtered from long names to a few keywords. For example, the category name "automobile repairs" may be tokenizes to "automobile" and "repairs." If this search is successful, the whole term of the normalized (i.e. the search term is stripped of pre-defined extraneous text, such as, removing words including "the", "a", "an", "corporation", "corp.", and "incorporation") and tokenized category names is cached at block 654. Processing proceeds to block 656 where a search is performed for category name against the top level. If this search is successful, processing proceeds to block 614 of FIG. 6A. If, however, the search of block 656 is unsuccessful in matching the category or keyword of the initial search query, a search is performed on the second level and third level (i.e. second level 420 and third level 430 of data taxonomy 400 of FIG. 4). If successful, processing proceeds to block 630 of FIG. 6B. If however, the search of block 658 is unsuccessful in matching the category or keyword of the initial search query, a search is performed on the leaf categories compared by weight at block 660. If successful, processing proceeds to block 640 of FIG. 6C. However, if the search of block 650 proves to be unsuccessful, processing proceeds to block 662 of FIG. 6F.

As shown in FIG. 6F, the business directory listings are searched using the string entered in the initial search query at block 662. If this search is unsuccessful an error message is displayed at block 664 via search results 170b (of FIG. 3B) to indicate to the user (not shown) that no relevant matches were found. However, if the contrary is true, and the search is successful at block 662, an error message is generated and displayed at block 666 to the user via search results 170b (of FIG. 3B) to indicate that no categories were found, however, the following listings were found. The listings are displayed according to block 608 of FIG. 6.

In sum, the present invention provides a system and methods for providing a rich and automatically degrading business directory search engine providing more relevant results for inputted search queries. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method for providing business directory search results, comprising the acts of:

(a) providing a directory of business listings comprising a tree having leaf level editorial nodes having labels representative of business categories, said leaf level editorial nodes having industry standardized code based business listings associated therewith;

(b) accepting at least one search query related to a desired business category;

(c) comparing said search query with said editorial nodes so that the highest level editorial node matching said search query is determined; and (d) retrieving a highest weighted one of said industry standardized code based business listings associated with a leaf level editorial node coupled to said determined editorial node.

2. The method recited in claim 1, wherein step (b) is performed by a computing application having a user interface accepting said at least one search query.

3. The method recited in claim 2, wherein said specific search query data comprises at least one of a group consisting of: business location information, business name information, and user's location information.

4. The method recited in claim 1, wherein said comparing step comprises bounded comparisons and proximity comparisons.

5. The method recited in claim 4, wherein said bounded comparison comprises comparing SIC base business listings against a user specified geographic area.

6. The method recited in claim 4, wherein said proximity comparison comprises the steps of calculating the longitudinal and latitudinal position of a point relative to a user's inputted location, and retrieving industry standardize code based business listings within a pre-defined specified distance to said calculated point.

7. The method recited in claim 1, wherein said computing system comprises a computer network having at least one server computer electronically coupled to at least one server computer, said at least one of server computers capable of accepting and processing search query data from said at least one of client computers.

8. The method recited in claim 7, wherein said computer network comprises one of a group consisting of: a LAN, a WAN, or the Internet.

9. A computer-readable medium bearing computer-readable instructions for instructing a computer to carry out the steps recited in claim 1.

10. In a computing system having at least one server computer electronically coupled through a communications network to at least one client computer, a method to provide business directory listing information performing the acts of:

(a) providing a directory of business listings comprising a tree having leaf level editorial nodes having labels representative of business categories, said leaf level editorial nodes having industry standardized code based business listings associated therewith;

(b) accepting at least one search query related to a desired business category;

(c) comparing said search query with said editorial nodes so that the highest level editorial node matching the search term is determined; and (d) retrieving a highest weighted one of said SIC base business listings associated with a leaf level editorial node coupled to said determined editorial node.

11. The method recited in claim 10, wherein steps (a)–(d) are performed by computing applications residing on said at least one client and said at least one server computer, said client computer computing application having a search interface to accept search queries, said server computer computing application cooperating with a data store having said tree of business listings.

12. The method recited in claim 10, wherein said communications network comprises: a LAN, a WAN, and the Internet.

13. A computer-readable medium bearing computer-readable instructions for instructing a computer to carry out the steps recited in claim 10.

14. A system to provide business directory search results comprising:

a business category processing component, said business category processing component comprising a directory of business listings having a tree with leaf level editorial nodes, said leaf level editorial nodes having labels representative of business categories and have industry standardized code based business listings associated therewith, said business category component accepting at least one search query related to a desired business category, comparing said search query with said editorial nodes so that the highest level node matching said search query is determined, and retrieving a highest weighted one of said industry standardized code based business listings associated with a lead level editorial node coupled to said determined editorial node; and a business name processing component, said business name processing component comprising a directory of editorialized and normalized business listings having business names, said business name processing component accepting at least one search query related to a desired business listing, tokenizing said search query to format said search query according to keywords of said editorialized business listings, comparing said search query against said editorialized business listings to determine exact or partial name matches between said search query and said editorialized and normalized business listings, returning best results from said comparing step, said best results comprising exact and partial business name matches.

15. The system recited in claim 14, wherein said business category processing component and said business name processing component reside on a computer network having at least one client computer and one server computer, said client computer communicating to said server computer over a communications network comprising any one of a fixed wire LAN, wireless LAN, fixed wire WAN, and wireless WAN.

16. The system recited in claim 15, wherein said business category processing component and said business name processing component comprise a first computing application operating on said server computer of said computer network and a second computing application operating on said client computer of said computer network, said second computing application having a graphical interface accepting said search queries.

17. A system to provide business directory search results comprising:

a data accepting system to accept search query data;

a data communications system to pass said accepted search query; and a processing system to process search query data, said processing system providing a directory of business listings having a tree having editorial nodes having labels representative of business categories, said leaf level editorial nodes having industry standardized code based business listings associated therewith, and retrieving a highest weighted one of said industry standardized code based business listings associated with a leaf level editorial node.

18. The system recited in claim 17, wherein said data accepting system comprises a computing application having a user interface that accepts data according to set formats.

19. The system recited in claim 18, wherein said set formats comprise: business name information, business location information, and user location information.

20. The system recited in claim 17, wherein said data communications system comprises a LAN, a WAN, and the Internet.

* * * * *